Aug. 11, 1942.  S. E. HEREN  2,292,999
LICENSE TAG HOLDER
Filed Dec. 7, 1939  2 Sheets-Sheet 1
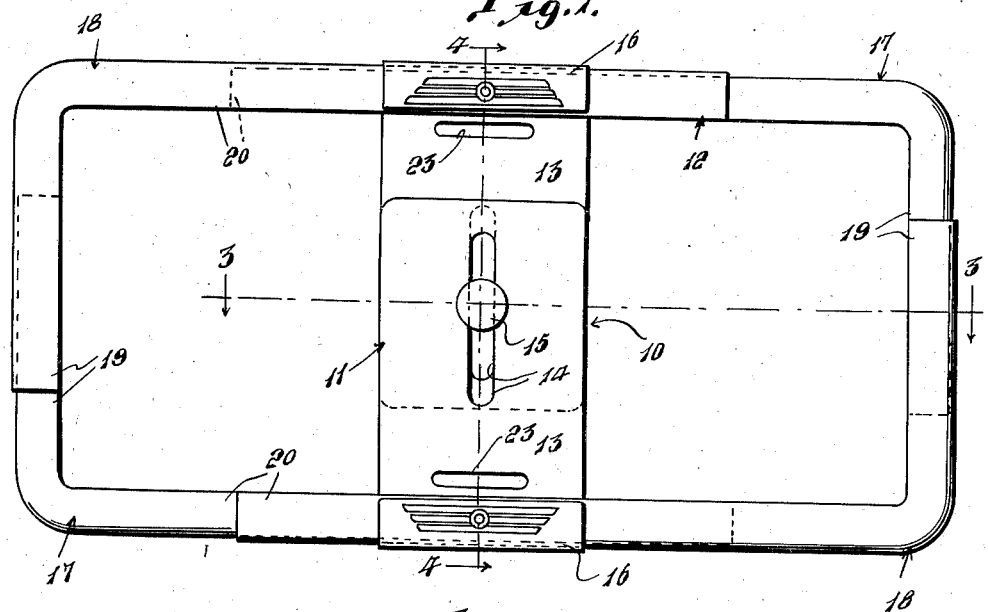
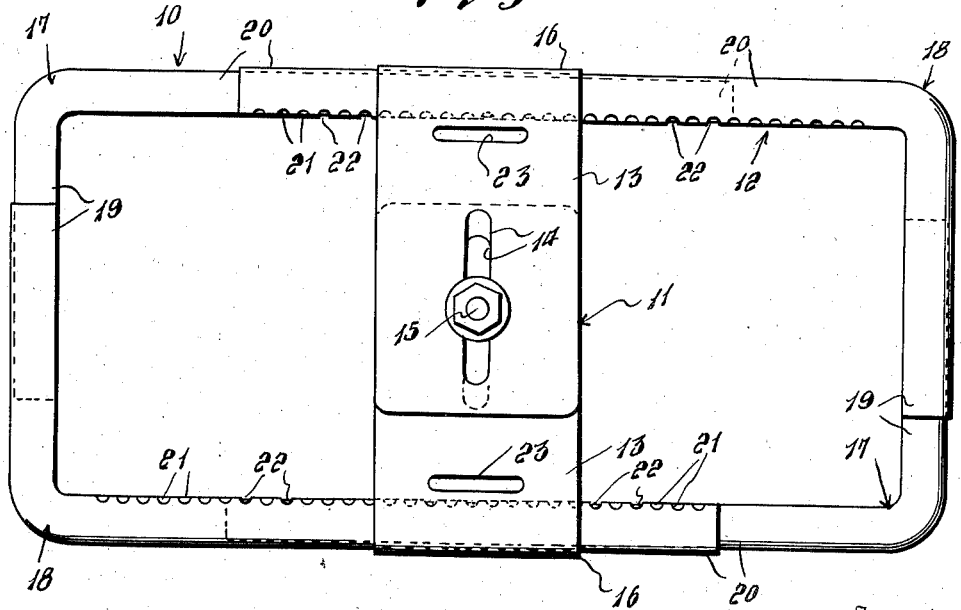
Inventor
Sol E. Heren
By L. F. Randolph
Attorney

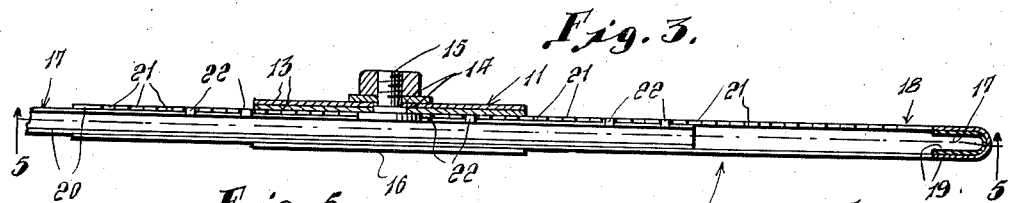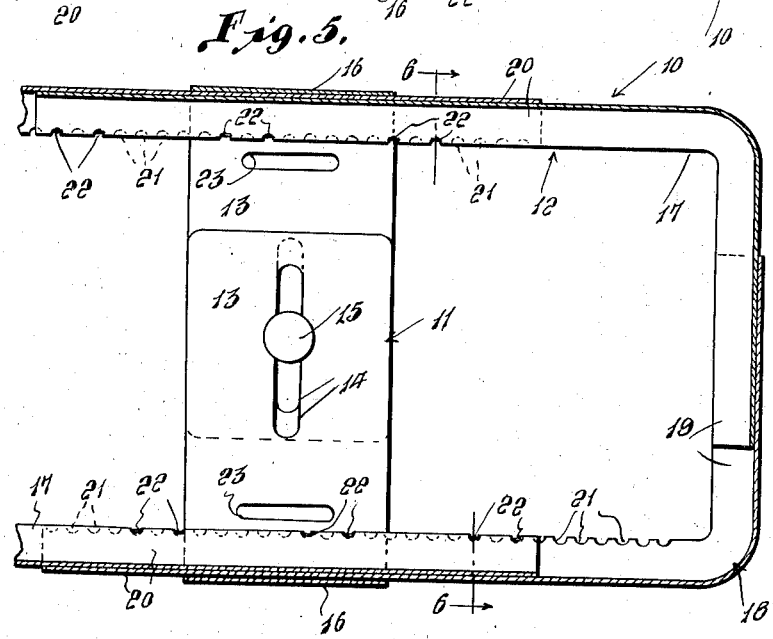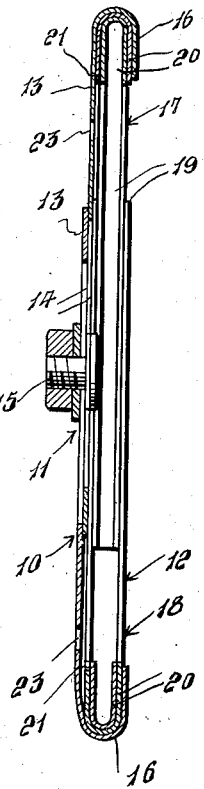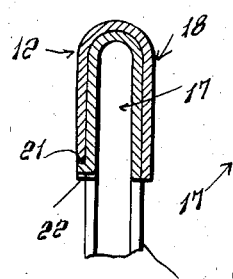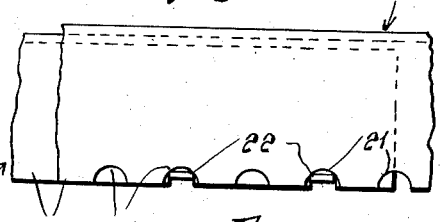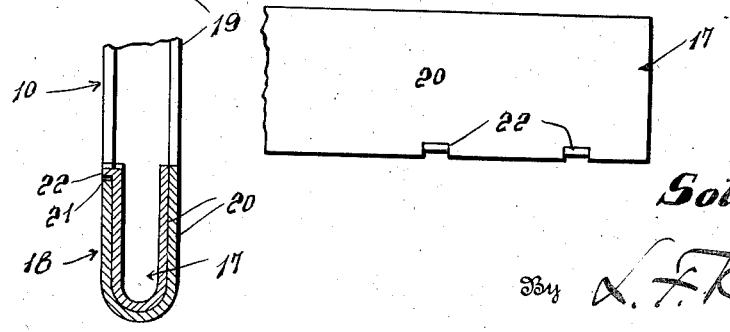

Patented Aug. 11, 1942

2,292,999

UNITED STATES PATENT OFFICE 2,292,999

LICENSE TAG HOLDER

Sol E. Heren, Phoenix, Ariz.

Application December 7, 1939, Serial No. 308,096

3 Claims. (Cl. 40—125)

This invention relates to an improved adjustable holder for supporting license tags of various sizes by engagement with the edges thereof so that the indicia thereon will not be obscured.

It is an aim of the invention to provide a holder for license tags which may be readily applied to or removed from a license tag, and which can be easily and quickly attached to or detached from a license tag holding bracket of a vehicle and which will securely hold the tag and prevent rattling.

Another object of the invention is to provide a construction of license tag holder which may be economically manufactured, which will be durable, and which may be adjusted for license tags of different sizes.

More particularly, the invention aims to provide a holder including an endless frame formed of telescoping channel shaped sections adapted to be extended laterally and longitudinally, and an adjustable support for connecting the frame to a license tag holding bracket and for retaining it in an assembled position on a license tag.

Other objects and advantages of the invention will hereinafter become more fully apparent from the following description of the drawings, which illustrate a preferred embodiment thereof, and wherein—

Figure 1 is a front elevational view showing the holder assembled,

Figure 2 is a rear elevational view of the same,

Figure 3 is a horizontal sectional view taken substantially along the plane of the line 3—3 of Figure 1, Figure 4 is a transverse vertical sectional view taken substantially along the plane of the line 4—4 of Figure 1, Figure 5 is a longitudinal vertical sectional view taken substantially along the plane of the line 5—5 of Figure 3, Figure 6 is a transverse vertical sectional view taken substantially along the plane of the line 6—6 of Figure 5, Figure 7 is an enlarged fragmentary side elevational view showing the interlocking means for connecting the angular frame sections, and Figure 8 is an enlarged fragmentary side elevational view of a portion of one of the frame sections.

Referring more particularly to the drawings, wherein like reference characters designate like or corresponding parts throughout the different views, 10 designates generally the license tag holder including the supporting member, designated generally 11, and the endless channel shaped frame, designated generally 12.

The supporting member 11 is formed of the corresponding sections 13 which are provided, adjacent corresponding ends, with complementary longitudinally disposed slots 14 to receive a nut and bolt fastening 15 for connecting the sections 13. Sections 13, by means of the slot and fastening connection 14 and 15, respectively, are slidably mounted relatively to each other and are adapted to be secured in adjusted position by tightening the nut of the fastening 15. The opposite or remote ends of the sections 13 are bent backwardly upon themselves to provide the hook or channel shaped portions 16, for a purpose which will hereinafter be explained.

The endless frame 12 comprises four angular or L-shaped sections, each of which is channel shaped in cross section. The two diagonally opposed angular sections 17 are slightly smaller in cross section than the other two diagonally opposed sections 18, as best illustrated in Figure 6. The angular sections 17 and 18 each include a short leg 19 and a relatively long leg 20. The leg 19 of each of the sections 17 telescopes into a leg 19 of a section 18 and the legs 20 of the sections 17 telescope into the complementary legs 20 of the sections 18 to form the endless frame 12 which is adapted to engage the marginal edges of a license tag, not shown.

As best seen in Figures 5 and 7, the legs 20 of the sections 18 are provided with spaced notches 21. Notches 21 are formed in a corresponding edge of each of these legs to receive the studs 22 which are struckout from the corresponding edges of the legs 20 of the sections 17, as best seen in Figure 6, for interlocking the sections against longitudinal movement.

The endless frame 12 is assembled in the manner as illustrated in Figures 1 and 2, with the L-shaped sections 17 in diagonally opposed relationship to each other and with the L-shaped sections 18 similarly disposed relatively to each other. To apply the holder 10 to a license tag, not shown, the holder 10 is disassembled by detaching the supporting member 11 and then detaching the four L-shaped sections 17 and 18. Sections 17 are then applied to diagonally opposed corners of the license tag with portions of the transverse edges thereof disposed in the legs 19 and portions of the longitudinal edges disposed in the legs 20. The studs 22 are disposed at the back of the license plate and project outwardly therefrom. The sections 18 are then applied to the other two corners of the license tag with their legs 20 engaging the exposed portions of the longitudinal edges of the license tag and overlapping the free ends of the adjacent legs 20 of the sections 17. The legs 19 of sections 18 are similarly disposed for engaging the exposed portions of the transverse edges of the license tag and for overlapping the adjacent ends of legs 19 of sections 17. The sections 18 are best applied by first moving them longitudinally of the license tag and of the sections 17, until their legs 19 are in abutting engagement with the legs 19 of sections 17 after which sections 18 are moved laterally until the legs 20 similarly engage legs 20 of sections 17. Sections 18 are disposed with the notches 21 of their legs 20 to the rear of the license plate so that when the sections are pressed tight together, as just described, the studs 22 will be received in certain of these notches to secure the frame 12 against longitudinal movement. The support 11 is then applied to the back of the frame 12 with its hooked ends tightly engaging the overlapping legs 20 after which the nut of the fastening 15 is tightened to secure the frame 12 to the license tag. Support 11 functions to prevent lateral extension of the frame 12 and in addition is adapted to be secured to a license tag holding bracket of a vehicle, not shown, either by means of the fastening 15 or by other fastenings, not shown, which could be positioned in the slots 23 of the support sections 13.

To remove the license tag holder 10, it is first detached from the license tag supporting bracket after which the fastening 15 is loosened so that sections 13 may be extended to detach the supporting member 11. The L-shaped sections 18 are then moved laterally away from the license tag to detach their notches 21 from the studs 22 after which they can be entirely detached from the license tag and from the sections 17 or the sections 17 and 18 may then be extended longitudinally and laterally to release the license tag.

Various modifications and changes in the embodiment of the invention as illustrated and described are contemplated and may obviously be resorted to.

I claim as my invention:

1. A license tag holder comprising an elongated substantially rectangular frame formed of angular telescoping sections, said frame including pairs of sections, the sections of each of said pairs of sections being disposed at opposite corners of the frame, said sections being U-shaped in cross section, the sections of one of said pairs being larger in cross section than the sections of the other pair, the ends of the smaller sections being slidably disposed in the adjacent, complementary ends of the larger sections, said sections each including a long end and a short end, the long ends of the smaller sections having outwardly projecting fixedly disposed lugs, the corresponding ends of the larger sections having notches for detachably engaging said lugs for interlocking the long ends of the sections, said frame being adapted to engage a license tag with the edges thereof disposed in the channels of the sections to prevent the smaller sections from being moved inwardly of the frame to disengage the notches and lugs, and a supporting member formed of slidably connected sections having hook shaped ends, said supporting member being disposed transversely of the frame with its hooked shaped ends engaging over the overlapping portions of the long ends of the frame sections to prevent outward movement of the longer sections transversely of the frame and to thereby combine with the license tag to hold the frame sections from moving laterally of the frame and to thereby retain the lugs and notches in interlocking engagement to prevent longitudinal movement of the sections relatively to the frame.

2. A license plate holder comprising a pair of L-shaped outer members having oppositely disposed horizontal and vertical legs, the members being of U cross section and each having spaced notches in its horizontal leg, a pair of L-shaped inner members having oppositely disposed horizontal and vertical legs of U cross section fitting within the opposed legs of the outer members, each of the horizontal legs of the inner members having a tongue extending outwardly and engaging within one of the notches in the corresponding outer member, whereby longitudinal sliding movement of the horizontal legs of the inner and outer members is prevented, and means to clamp the inner and outer members together to form a hollow rectangular frame.

3. A license plate holder comprising a pair of L-shaped outer members having oppositely disposed horizontal and vertical legs, the members being of U cross section and each having spaced notches in its horizontal leg, a pair of L-shaped inner members having oppositely disposed horizontal and vertical legs of U cross section fitting within the opposed legs of the outer members, each of the horizontal legs of the inner members having a tongue extending outwardly and engaging within one of the notches in the corresponding outer member, whereby longitudinal sliding movement of the horizontal legs of the inner and outer members is prevented, and an adjustable clamp having U-shaped ends fitting over the horizontal legs of the outer members to prevent their outward movement, and means to secure the clamp in adjusted position.

SOL E. HEREN.